US011341138B2

(12) United States Patent
Cohen et al.

(10) Patent No.: US 11,341,138 B2
(45) Date of Patent: May 24, 2022

(54) METHOD AND SYSTEM FOR QUERY PERFORMANCE PREDICTION

(71) Applicant: International Business Machines Corporation, Armonk, NY (US)

(72) Inventors: Doron Cohen, Misgav (IL); Shai Erera, Misgav (IL); Haggai Roitman, Yokneam Ilit (IL); Bar Weiner, Hof Ashqelon (IL)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 15/832,810

(22) Filed: Dec. 6, 2017

(65) Prior Publication Data

US 2019/0171742 A1    Jun. 6, 2019

(51) Int. Cl.
*G06F 16/00* (2019.01)
*G06F 16/2455* (2019.01)
*G06F 16/93* (2019.01)
*G06F 16/2457* (2019.01)
*G06F 16/2453* (2019.01)

(52) U.S. Cl.
CPC .... *G06F 16/24553* (2019.01); *G06F 16/2453* (2019.01); *G06F 16/24578* (2019.01); *G06F 16/93* (2019.01)

(58) Field of Classification Search
CPC ............... G06F 16/93; G06F 16/2453; G06F 16/24553; G06F 16/24578
USPC .......................................................... 707/749
See application file for complete search history.

(56) References Cited

U.S. PATENT DOCUMENTS

| 6,542,886 | B1* | 4/2003 | Chaudhuri | G06F 16/30 |
| 8,166,039 | B1* | 4/2012 | Haveliwala | G06F 16/3347 |
| | | | | 707/741 |
| 8,438,155 | B1* | 5/2013 | Fedorynski | G06F 16/951 |
| | | | | 707/723 |
| 8,799,282 | B2* | 8/2014 | Goldenberg | G06F 11/079 |
| | | | | 707/726 |

(Continued)

OTHER PUBLICATIONS

Collins-Thompson, "Robust Model Estimation Methods for Information Retrieval", Submitted in partial fulfillment of the requirements for the degree of Doctor of Philosophy, Language Technologies Institute, School of Computer Science, Carnegie Mellon University, Dec. 2008.

(Continued)

*Primary Examiner* — Ashish Thomas
*Assistant Examiner* — Rezwanul Mahmood
(74) *Attorney, Agent, or Firm* — Barry D. Blount

(57) ABSTRACT

A computer-implemented method, computerized apparatus and computer program product for query performance prediction, the method comprising: obtaining a result list comprising a listing of documents retrieved from a collection in response to a query; obtaining for each of the listed documents in the result list a score indicating a measure of the document's relevance to the query; sampling the result list to obtain a plurality of sub-lists each of which comprising a listing of documents subsumed by the result list; for each of the plurality of sub-lists, analyzing scores of the documents listed therein to obtain a sample performance estimator; and estimating performance of the result list based on the sample performance estimator of each of the plurality of sub-lists.

17 Claims, 4 Drawing Sheets

(56) References Cited

U.S. PATENT DOCUMENTS

| | | | |
|---|---|---|---|
| 10,740,415 B2* | 8/2020 | Zhong | G06F 16/9535 |
| 10,770,897 B1* | 9/2020 | Hertz-Shargel | H02J 3/00 |
| 11,269,891 B2* | 3/2022 | Frank | G06F 16/24578 |
| 2002/0152035 A1* | 10/2002 | Perlin | G16B 30/20 |
| | | | 702/20 |
| 2003/0018615 A1* | 1/2003 | Chaudhuri | G06F 16/2462 |
| 2004/0215606 A1* | 10/2004 | Cossock | G06F 16/337 |
| 2004/0225639 A1* | 11/2004 | Jakobsson | G06F 16/2462 |
| 2005/0021290 A1* | 1/2005 | Velipasaoglu | G06Q 10/04 |
| | | | 702/182 |
| 2005/0271175 A1* | 12/2005 | Lashkarian | H04L 27/2657 |
| | | | 375/355 |
| 2006/0179038 A1* | 8/2006 | Edwards | G06Q 10/107 |
| 2007/0016574 A1* | 1/2007 | Carmel | G06F 16/951 |
| | | | 707/999.005 |
| 2008/0027913 A1* | 1/2008 | Chang | G06F 16/00 |
| 2008/0077570 A1* | 3/2008 | Tang | G06F 16/951 |
| | | | 707/999.005 |
| 2008/0270364 A1* | 10/2008 | Bayardo | G06Q 30/02 |
| 2009/0037410 A1* | 2/2009 | Jones | G06F 16/951 |
| | | | 707/999.005 |
| 2009/0089630 A1* | 4/2009 | Goldenberg | G06F 16/2462 |
| | | | 714/704 |
| 2009/0157644 A1* | 6/2009 | Gollapudi | G06F 16/3334 |
| | | | 707/999.005 |
| 2009/0249218 A1* | 10/2009 | Hamaoui | G06F 16/9562 |
| | | | 715/745 |
| 2010/0121840 A1* | 5/2010 | Murdock | G06F 16/3346 |
| | | | 703/13 |
| 2010/0125559 A1* | 5/2010 | Hadjieleftheriou | G06F 16/24545 |
| | | | 707/706 |
| 2010/0273670 A1* | 10/2010 | Rowlen | C12Q 1/70 |
| | | | 506/9 |
| 2011/0196859 A1* | 8/2011 | Mei | G06F 16/248 |
| | | | 707/723 |
| 2011/0270845 A1* | 11/2011 | Lin | G06F 16/951 |
| | | | 707/E17.014 |
| 2012/0290607 A1* | 11/2012 | Bhargava | G16H 50/70 |
| | | | 707/769 |
| 2013/0024448 A1* | 1/2013 | Herbrich | G06F 16/951 |
| | | | 707/E17.014 |
| 2013/0073212 A1* | 3/2013 | Kenny | A61P 15/00 |
| | | | 702/19 |
| 2013/0111005 A1* | 5/2013 | Chu | G06F 11/00 |
| | | | 709/224 |
| 2013/0304392 A1* | 11/2013 | Deciu | G16B 30/10 |
| | | | 702/20 |
| 2013/0325588 A1* | 12/2013 | Kalyanam | G06Q 30/0243 |
| | | | 705/14.42 |
| 2014/0019394 A1* | 1/2014 | Laxminarayan | G06Q 10/101 |
| | | | 706/45 |
| 2015/0049943 A1* | 2/2015 | Hamsici | G06K 9/6256 |
| | | | 382/218 |
| 2015/0095017 A1* | 4/2015 | Mnih | G06F 40/284 |
| | | | 704/9 |
| 2015/0161163 A1* | 6/2015 | Cypher | G06F 16/278 |
| | | | 707/610 |
| 2015/0235160 A1* | 8/2015 | Larlus-Larrondo | G06Q 10/06398 |
| | | | 705/7.42 |
| 2015/0286686 A1* | 10/2015 | Boley | G06F 16/2465 |
| | | | 707/722 |
| 2015/0310115 A1* | 10/2015 | Ryger | G06F 16/93 |
| | | | 707/708 |
| 2015/0332169 A1* | 11/2015 | Bivens | G06N 20/00 |
| | | | 706/12 |
| 2016/0019213 A1* | 1/2016 | Carmel | G06F 16/951 |
| | | | 707/728 |
| 2016/0048603 A1* | 2/2016 | Heidel | G06Q 10/10 |
| | | | 715/739 |
| 2016/0055236 A1* | 2/2016 | Frank | G06F 40/35 |
| | | | 707/748 |
| 2016/0098448 A1* | 4/2016 | McShane | G06F 40/205 |
| | | | 707/713 |
| 2016/0170996 A1* | 6/2016 | Frank | G06F 16/24575 |
| | | | 707/748 |
| 2016/0170998 A1* | 6/2016 | Frank | G06F 16/337 |
| | | | 707/748 |
| 2016/0188599 A1* | 6/2016 | Maarek | G06F 16/90335 |
| | | | 707/728 |
| 2016/0224803 A1* | 8/2016 | Frank | G06F 21/6245 |
| 2016/0300252 A1* | 10/2016 | Frank | G06F 16/24578 |
| 2017/0016733 A1* | 1/2017 | Rolf | G06F 16/325 |
| 2017/0061329 A1* | 3/2017 | Kobayashi | G06N 20/00 |
| 2017/0075893 A1* | 3/2017 | Hummel | G06F 16/24578 |
| 2017/0083602 A1* | 3/2017 | Liu | G06F 40/284 |
| 2017/0091288 A1 | 3/2017 | Cohen et al. | |
| 2017/0098153 A1* | 4/2017 | Mao | G06N 3/0454 |
| 2017/0124652 A1* | 5/2017 | Beaven | G06Q 40/06 |
| 2017/0228425 A1* | 8/2017 | Kandula | G06N 7/005 |
| 2017/0262635 A1* | 9/2017 | Strauss | G06Q 30/0275 |
| 2017/0293691 A1* | 10/2017 | Zitouni | G06N 20/00 |
| 2017/0335287 A1* | 11/2017 | Quarta | A61K 35/34 |
| 2017/0357905 A1* | 12/2017 | Rossi | G06N 5/022 |
| 2018/0018587 A1* | 1/2018 | Kobayashi | G06N 5/04 |
| 2018/0025368 A1* | 1/2018 | Frank | G06Q 10/101 |
| | | | 705/7.29 |
| 2018/0032671 A1* | 2/2018 | Mazloom | G16B 20/10 |
| 2018/0060398 A1* | 3/2018 | Johnson | G06F 16/24554 |
| 2018/0253661 A1* | 9/2018 | Strauss | G06Q 50/01 |
| 2019/0026279 A1* | 1/2019 | Roitman | G06N 20/00 |
| 2019/0065576 A1* | 2/2019 | Peng | G06F 16/3329 |
| 2019/0171742 A1* | 6/2019 | Cohen | G06F 16/2453 |
| 2019/0286540 A1* | 9/2019 | Bates | G06K 9/6218 |
| 2021/0254166 A1* | 8/2021 | Walker | A61P 35/00 |

OTHER PUBLICATIONS

Roitman et al., "Robust Standard Deviation Estimation for Query Performance Prediction", Proceedings of the ACM SIGIR International Conference on Theory of Information Retrieval, 2017, pp. 245-248.

Roitman, "An Enhanced Approach to )ery Performance Prediction Using Reference Lists", Proceedings of the 40th International ACM SIGIR Conference on Research and Development in Information Retrieval, 2017, pp. 869-872.

* cited by examiner

METHOD AND SYSTEM FOR QUERY PERFORMANCE PREDICTION

TECHNICAL FIELD

The present disclosure relates to information retrieval in general, and to query performance prediction, in particular.

BACKGROUND

Information Retrieval (IR) is the task of retrieving, from a given collection or corpus of information resources, a subset of information resources that meets a specified information need. Information resources (e.g., documents) may be of an unstructured nature (e.g., text), wherein retrieval or search thereof may be carried out either through direct processing (e.g., full-text searching), by using content-based indexing (e.g., keywords or tags), or the like. As a scientific discipline, IR may include, for example, technology and research of searching either for information in a certain document or for the documents themselves, as well as searching for metadata that describe information or data, searching for collections of information resources (e.g., databases of texts, images or sounds), and the like.

An information need may be conveyed in a form of a query (e.g., a search string, as in web search engines or the like). The query may not uniquely identify a single object in the searched collection, but rather there may be several objects matched therewith, possibly at varying degrees of relevance. The relevance of a returned result to a query may be estimated in a form of a numeric score, and the list of results may be ranked in accordance with their corresponding score values. The user may be presented with the top-ranking results (e.g., the first ten leading scored results).

BRIEF SUMMARY

One exemplary embodiment of the disclosed subject matter is a computer-implemented method comprising: obtaining a result list comprising a listing of documents retrieved from a collection in response to a query; obtaining for each of the listed documents in the result list a score indicating a measure of the document's relevance to the query; sampling the result list to obtain a plurality of sub-lists each of which comprising a listing of documents subsumed by the result list; for each of the plurality of sub-lists, analyzing scores of the documents listed therein to obtain a sample performance estimator; and estimating performance of the result list based on the sample performance estimator of each of the plurality of sub-lists.

Another exemplary embodiment of the disclosed subject matter is a computerized apparatus having a processor, the processor being adapted to perform the steps of: obtaining a result list comprising a listing of documents retrieved from a collection in response to a query; obtaining for each of the listed documents in the result list a score indicating a measure of the document's relevance to the query; sampling the result list to obtain a plurality of sub-lists each of which comprising a listing of documents subsumed by the result list; for each of the plurality of sub-lists, analyzing scores of the documents listed therein to obtain a sample performance estimator; and estimating performance of the result list based on the sample performance estimator of each of the plurality of sub-lists.

Yet another exemplary embodiment of the disclosed subject matter is a computer program product comprising a non-transitory computer readable storage medium retaining program instructions, which program instructions when read by a processor, cause the processor to perform a method comprising: obtaining a result list comprising a listing of documents retrieved from a collection in response to a query; obtaining for each of the listed documents in the result list a score indicating a measure of the document's relevance to the query; sampling the result list to obtain a plurality of sub-lists each of which comprising a listing of documents subsumed by the result list; for each of the plurality of sub-lists, analyzing scores of the documents listed therein to obtain a sample performance estimator; and estimating performance of the result list based on the sample performance estimator of each of the plurality of sub-lists.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
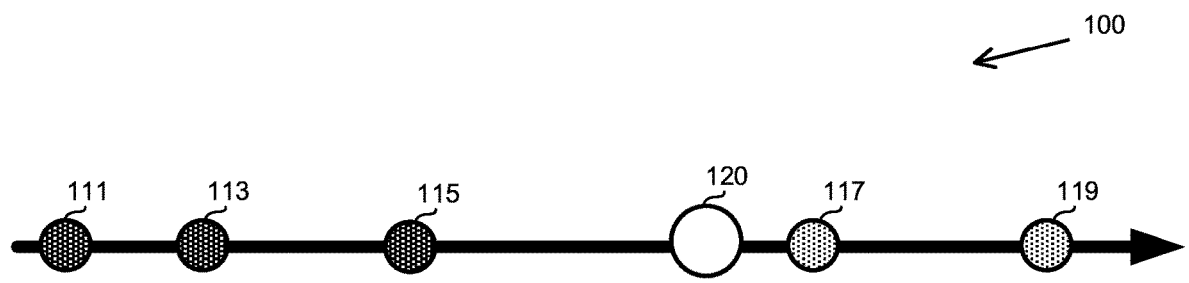
FIGS. 1A-1B show schematic illustrations of exemplary distributions of retrieval scores used for query performance prediction, in accordance with some exemplary embodiments of the disclosed subject matter.

One example of an issue being dealt with in the context of various IR practical applications and studies is the problem of post-retrieval query performance prediction (QPP). In a post-retrieval QPP scheme, a query's performance is predicted based on the quality of its retrieved result list, i.e. the documents most highly ranked in response to the query.

One approach to post-retrieval QPP that may be utilized is the analysis of retrieval scores. Specifically, the standard deviation of retrieval scores may be employed as an indicator of query performance Higher standard deviation may attest to lower chance of query drift or higher content diversity, which in turn, may result in a better query performance. In the context of QPP, "query drift" is a term of art, relating to the presence and dominance of non-query-related aspects or topics that are manifested in documents in the result list. The query drift problem concerns a phenomena where the retrieved result list exhibits a bias towards documents that are irrelevant to the actual information need of the user. For example, a user may enter as a query the string "Java", in interest of receiving information on the Java programming language, but instead the returned results may relate to the Island of Java, or rather to coffee originating from that geographic region. Similarly, if the query is about copper mines and the top several documents are all about mines in Chile, then there may be query drift in the direction of documents on Chile.

One technical problem dealt with by the disclosed subject matter is to provide a post-retrieval QPP scheme for estimating relevance of a result list to a query. Formally speaking, given a query denoted herein as q, a collection of documents (i.e., corpus) denoted herein as C, and a result list D of the top-k documents in the corpus d ∈ C with the highest retrieval scores s(d|q), the goal is to estimate a likelihood of finding relevant information for the query q in the returned result list D. As noted herein, one may estimate such likelihood by analyzing the retrieval scores s(d|q) of the documents in the result list D. Specifically, one may utilize the standard deviation of the retrieval scores denoted herein as $\sigma_{s|q}$ as an indicator of query performance. It therefore may be desired that the standard deviation as $\sigma_{s|q}$ is estimated as accurately as possible.

One technical solution is to employ a standard deviation estimator that utilizes several document result lists as reference lists for QPP. Each such list may be sampled from the original retrieved result list. It will be appreciated that such an approach may differ from approaches in which the standard deviation is estimated directly using only the original retrieved result list.

In some exemplary embodiments, various document samples may be obtained using a bootstrap sampling approach. Such sampling approach may simulate a "random user" that "browses" the retrieved result list and "clicks" on the documents that should be included in a given sample. Various samples may be further weighted based on their presumed quality.

In the context of statistical analysis, the term "bootstrapping" refers to a technique of resampling, wherein a number of samples are repeatedly drawn, with replacement, from a single original sample. The bootstrap samples (i.e., resampled data) are then used for inference of a statistic or estimator of the original sample, which in turn may be used as approximation to that of the population from which the original sample was drawn. The bootstrapping approach thus relies on an assumption that inference of the true probability distribution P given the original sample, is analogous to inference of the empirical distribution $\hat{P}$ of the original sample given the resampled data.

In some exemplary embodiments, an estimation of the retrieval scores standard deviation $\sigma^{s|q}$ may be obtained using N≥1 samples $D_1, D_2, \ldots, D_N$, wherein each sample satisfies $D_j \subseteq D$ and contains $|D_j|=l<k$ documents. A bootstrap estimator may be calculated in accordance with the following formula (1):

$$\hat{\sigma}_{s|q} \overset{def}{=} \sqrt{\sum_{j=0}^{N} \omega(D_j) \cdot \widehat{var}(s \mid q, D_j)} \quad (1)$$

wherein $$\widehat{var}(s \mid q, D_j) \overset{def}{=} \frac{1}{l-1} \sum_{d \in D_j} (s(d \mid q) - \hat{\mu} D_j)^2$$

denotes the unbiased variance estimate of documents scores in sample $D_1$, $$\hat{\mu} D_j \overset{def}{=} \frac{1}{l} \sum_{d \in D_j} s(d \mid q)$$

denotes the mean score of documents in sample $D_6$, and $\omega(D_j)$ is a non-negative real weight, which denotes the relative importance of sample $D_j$.

In some exemplary embodiments, a random sample $D_j \subseteq D$ which $\widehat{var}(s|q, D_j)$ is estimated based thereon, may be obtained by employing a bootstrap sampling approach in accordance with the disclosed subject matter. The random sampling may be without replacement ("WOR"), namely, a document $d \in D$ can appear in $D_j$ only once, at most. It will be noted however by a person skilled in the art that the samples $D_1, D_2, \ldots, D_N$ need not necessarily be disjoint; i.e., there may be a non-empty intersection between two or more bootstrap samples.

Additionally or alternatively, the random sample $D_j$ may be obtained using a ranked-biased sampling. Assuming documents in a result list are rank-ordered, e.g. in accordance with their retrieval score, such that highest scored documents are listed first and lowest scored documents are placed last in a descending order as the retrieval score decreases, one may obtain $D_j$ using a random sampling scheme that assigns high-ranked documents in D a higher probability to be chosen. For example, denoting the rank of document $d \in D$ as $r_d$, wherein $1 \leq r_d \leq k$, and denoting the rank distribution as $$p(r) \overset{def}{=} \frac{2(k+1-r)}{k(k+1)},$$

wherein $1 \leq r \leq k$, then one may use an acceptance-rejection approach under which document d may be included in $D_j$ if the following condition is satisfied: $\Sigma_{r=r_d}^{k} p(r) \geq u$, where $U \sim U[0,1]$ a random variable uniformly distributed in the interval between 0 and 1.

Additionally or alternatively, the random sample $D_j$ may be obtained using a round-robin scheme, wherein an ordered set of items is processed in a circular manner, such that when the last one is reached, the processing continues next to the first element in line, and starts again by the same order. Assuming the result list's documents are organized in a queue form, such as in accordance with a rank-ordering induced by their retrieval score, then one may go over the list from beginning to end, and randomly select whether or not a document at hand is to be included in the sample. The random selection may be based on any acceptable probability distribution p, such as, for example, a uniform distribution wherein all documents are equally likely to be chosen, a rank-biased distribution wherein documents with higher rank are more likely to be chosen over documents with low rank such as discussed herein, or the like. Once the end of the list is reached, the procedure may be resumed again at the beginning of the list, and so forth repeatedly, until the random sample $D_j$ has been populated or all documents in the list have been chosen, whichever is earlier.

It will be appreciated by a person skilled in the art that a bootstrap sampling approach that is without replacement, ranked-biased and uses round-robin scheme as disclosed herein, yields a sample $D_j$ as may be obtained by simulating the behavior of a random user who browses the documents in the result list D, as retrieved in response to the user's query q. The random user is assumed to scan the result list D from top to bottom. On each document, its likelihood of being included in $D_j$ is assumed to be relative to its likelihood of being "clicked" by the random user. Similar to real-world search settings, such random clicks are assumed to be rank-biased. Therefore, the higher the rank of document $d \in D$ is, the higher its chance of being clicked by the random user (hence ranked-biased sampling). By same considerations, it may also be assumed that the random user may click each document only once (hence a WOR sampling). It may yet also be assumed that, for a given required sample size $|D_j|=l \leq k$, the random user may click exactly 1 documents in D. Therefore, whenever the random user has reached the bottom of the list and there are still documents to click, the random user continues her scan again from the top of the list (hence a round-robin sampling).

For each sample $D_1$, a weight $\omega(D_j)$ may be assigned in accordance with a weighting scheme of choice. One exemplary weighting scheme may assign a uniform weight to all samples, whereby implying that all samples may be assumed to have the same importance. Formally, this scheme, denoted herein "uni", may be defined as in the following formula (2):

$$\omega_{uni}(D_j) \stackrel{def}{=} \frac{1}{N}, \qquad (2)$$

wherein, as can readily be noted by a person skilled in art, using the uni scheme, the standard deviation is estimated according to the average of the samples' variances.

Another exemplary weighting scheme may assign weights based on a notion that each sample $D_j$ may be treated as a "reference list", namely, an alternative result list for which a relevance degree to the query q may be presumed known, and thus may be used for predicting relevance of a given result list, such as the sampled result list D. See, for example, in: A. Shtok, O. Kurland, and D. Carmel. "Query performance prediction using reference lists". ACM Trans. Inf. Syst., 34(4):19:1-19:34, June 2016, which is hereby incorporated by reference in its entirety without giving rise to disavowment. Accordingly, such weighting scheme, denoted herein "sim", may use a measure of similarity between sample $D_j$ and result list D as the respective weight $\omega(D_j)$. For example, the weight may be calculated using a similarity measure known as rank-biased overlap (RBO) as defined herein by the following formula (3):

$$\omega_{sim}(D_j) \stackrel{def}{=} \text{sim}_{RBO(p)}(D_j,D,D), \qquad (3)$$

wherein p is a free parameter which may be set to 0.95 or any other appropriate value in the range [0,1]. The RBO similarity measure is presented and discussed in: W. Webber, A. Moffat, and J. Zobel. "A similarity measure for indefinite rankings". ACM Trans. Inf. Syst., 28(4):20:1-20:38, November 2010. As can readily be noted by a person skilled in the art, this exemplary weighting scheme may assume each sample $D_j$ may be a relevant result list, also referred to as a pseudo effective (PE) reference list; therefore, the higher the similarity between D and $D_j$, the higher the importance $D_j$ may be assigned.

Yet another exemplary weighting scheme may assign each sample $D_j$ a weight in accordance with the deviation of its documents' retrieval scores from a score $s(C|q)$ indicating relevance of the document collection C as a whole to the query q, also referred to as the corpus query likelihood. For example, this exemplary weighting scheme, denoted herewith as "wig", may be calculated according to the following formula (4):

$$\omega_{wig}(D_j) \stackrel{def}{=} \frac{1}{l} \sum_{d \in D_j} (s(d \mid q) - s(C \mid q)), \qquad (4)$$

wherein (C|q) may be estimated by treating the corpus as a single document, e.g. as formed by concatenating all documents in the collection together. This exemplary weighting scheme considers the corpus as an ineffective reference document, namely a document presumed irrelevant to the query q, such that a sample $D_j$ whose documents' scores deviate more from the corpus score may be assumed to contain better (more relevant) documents, and therefore, may receive a higher weight. It should be appreciated that, while the calculation exemplified herein employs unigram language modeling, the disclosed subject matter is not meant to be so limited, and may be generalized to multigram language modeling as well, using a general weighted information gain (WIG) measure as discussed in: Y. Zhou and W. B. Croft. "Query performance prediction in web search environments". In Proceedings of SIGIR '07, which is hereby incorporated by reference in its entirety without giving rise to disavowment.

Another technical problem dealt with by the disclosed subject matter is to provide a post-retrieval QPP scheme that mitigates query-dependent effect or bias on estimation of relevance likelihood, such as, for example, an impact of a query's length on its predicted performance. As can be readily appreciated by a person skilled in the art, in order to enable useful evaluation of an IR system or comparison between two or more distinct IR tools, it may be desired to have a performance measure that is normalized over the space of all different possible queries. It may be further noted by a person skilled in the art that score divergence, for example, may be one such query-dependent quantity. Thus, if one wishes to assess performance of an IR system using standard deviation estimator of the retrieval scores or likewise measure, it may be preferred to eliminate or reduce influence of a query's particulars on the score distribution, as may be expressed in an estimation of the sort.

One technical solution is to employ normalization to obtain inter-query compatibility. The normalization may be effected thorough use of a factor aimed at modeling an extent to which the query provides correct representation of an underlying information need. The higher that factor is, namely, the better the query represents the information need, the better the retrieval results, i.e. the query performance, may be expected to get as well. Considering a set of queries and respective sets of relevant documents in a given collection as random samples drawn from a word vocabulary's (unknown) probability distribution, denoted herein as a relevance model R, then for a given query q, its anticipation of an underlying information need $I_q$ may be assessed using the probability p(w|R) assigned to each query word $w \in q$ by the relevance model R. For example, a weighted entropy measure of the relevance model R, wherein each query word $w \in q$ is assigned with a unit weight and all other terms in the vocabulary are assigned a zero weight, may be used to estimate query representativeness, in accordance with the following formula (5):

$$H(q|R) \stackrel{def}{=} -\Sigma_{w \in q} p(w|R) \log p(w|R), \qquad (5)$$

wherein high entropy, which implies to a relatively uniform importance assigned to each query word w ∈ q by the relevance model R, may be assumed as indicative of effective representation. A relevance model R may be approximated based on the observed word occurrences in a given document collection and set of queries, such as proposed and discussed in: V. Lavrenko and W. B. Croft, "Relevance based language models", In Proceedings of SIGIR '01, which is hereby incorporated by reference in its entirety without giving rise to disavowment.

In some exemplary embodiments, a normalized perplexity nperp(q|R) normalization term may be introduced, wherein for a query q having $n_q$ unique terms, the term may be calculated according to the following formula (6):

$$nperp(q \mid R) \stackrel{def}{=} \frac{2^{H(q|R)}}{2^{log n_q}} \quad (6)$$

wherein the weighted entropy measure H(q|R) may be calculated as detailed herein. In some further exemplary embodiments, the relevance model R may be estimated using the result list D. As may be readily noted by a person skilled in the art, from similar considerations as discussed herein with respect to the weighted entropy measure, a higher value of the normalized perplexity nperp(q|R) may indicate the query q being more "anticipated" by the relevance model R and thus assumed to provide a better representation of the information need $I_q$, which, in turn, may be assumed to result in better performance of the query q.

In some exemplary embodiments, the normalization may additionally or alternatively account for pre-retrieval QPP considerations, such as, for example, relevance likelihood of the entire document collection, as a whole, to a query at hand, also referred to as corpus query likelihood. A bootstrap estimate of the standard deviation of retrieval scores $\hat{\sigma}_{s|q}$ such as may be obtained as disclosed herein, may further be normalized in accordance to the following formula (7):

$$\hat{\sigma}_{s|q}^{norm} \stackrel{def}{=} \frac{\hat{\sigma}_{s|q} \cdot nperp(q \mid R)}{|S(C)|} \quad (7)$$

wherein |S(C)| denotes the (absolute) corpus query likelihood, and the normalized perplexity nperp(q|R) provides a measure of the query representativeness, which may be estimated as described herein. As may readily be noted by a person skilled in the art, such normalization utilizes the corpus as an ineffective reference document; the higher |S(C)| is, the more difficult the query q may be assumed to be.

It will be appreciated that the term "document" as used throughout the present disclosure is not to be construed narrowly as referring to textual or written information resource solely, but rather it is meant to be understood as referring to any kind of information resource of an arbitrary format available, including but not limited to visual or audiovisual information (e.g., pictures, sounds, audio or video clips, and the like), meta-data and analytics, and so forth.

Figure 1B:
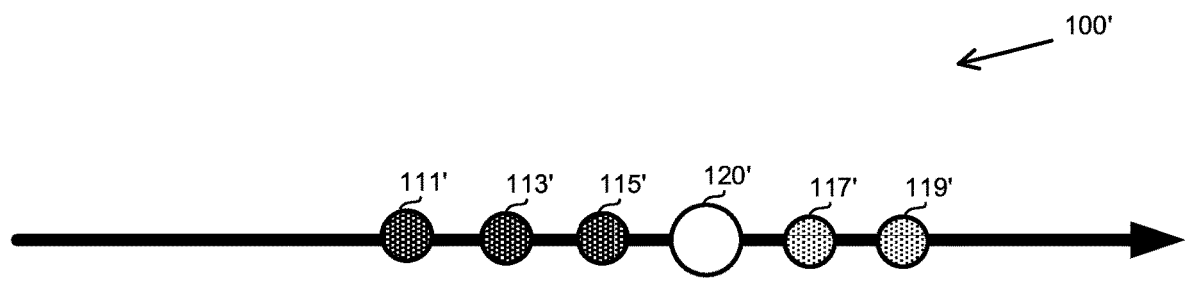

Referring now to FIGS. 1A-1B showing schematic illustrations of exemplary distributions of retrieval scores used for query performance prediction.

FIG. 1A shows a first exemplary Distribution 100 of retrieval Scores 111 to 119 as assigned to different documents with respect to a query by an IR method of choice. The Scores 111 to 119 are distributed around a Mean 120, with Scores 111, 113 and 115 being below the Mean 120 and Scores 117 and 119 being above it. FIG. 1B similarly shows a second exemplary Distribution 100' of retrieval Scores 111' to 119' centered on a Mean 120', with Scores 111' to 115' and 117' to 119' being below and above it, respectively. As illustrated in FIGS. 1A-1B, Scores 111 to 119 are, on average, more spaced from their respective Mean 120, as well as from one another, than Scores 111' to 119' are with respect to their corresponding Mean 120', thus giving rise to lower potential for query drift in Distribution 100 and higher potential for query drift in Distribution 100', accordingly.

Figure 2:
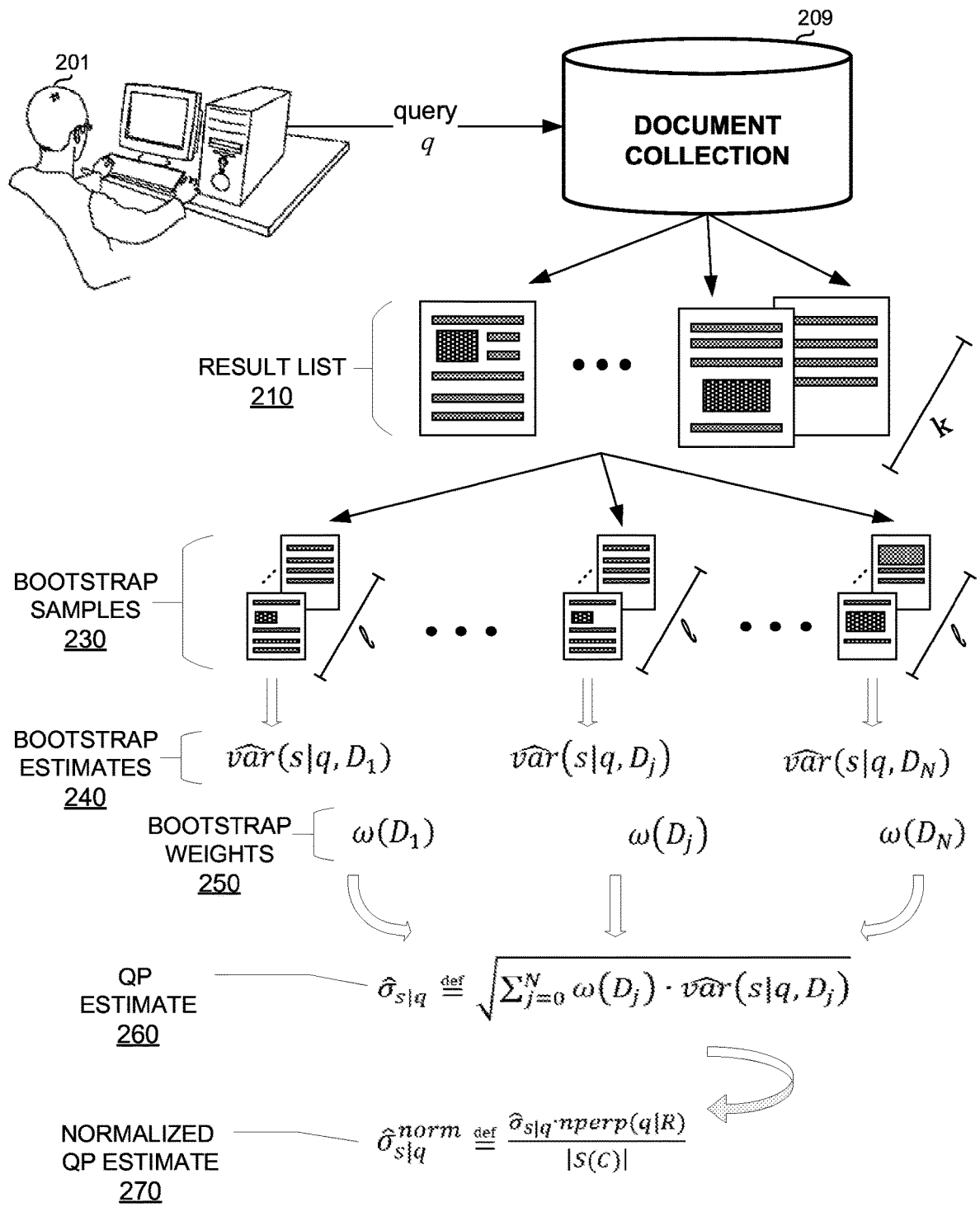
FIG. 2 shows schematic illustration of an exemplary environment and procedure in which the disclosed subject matter may be utilized, in accordance with some exemplary embodiments of the disclosed subject matter.

Referring now to FIG. 2 showing schematic illustration of an exemplary environment and procedure in which the disclosed subject matter may be utilized, in accordance with some exemplary embodiments of the disclosed subject matter.

A User 201 of an IR tool coupled to or comprising a Document Collection 209 may issue a query q aimed at representing an information need the User 201 may have. A plurality of documents presumed relevant to the query q and the information need it allegedly represents, may be retrieved from Document Collection 209 and ranked in accordance to an estimated relevance degree thereof, i.e., retrieval score. The top-k ranked documents may be listed in a Result List 210 which may be returned in response to the query q by the IR tool in question.

A plurality of Bootstrap Samples 230, i.e. sub-lists of a length l≤k may be generated by randomly sampling Result List 210. The sampling may be performed in accordance with any one of the approaches and schemes disclosed herein or combinations thereof, such as, for example, sampling without replacement (WOR), sampling in accordance with rank-biased distribution, sampling in round-robin order, and the like.

Each of the plurality of Bootstrap Samples 230 may be analyzed so as to obtain a plurality of corresponding Bootstrap Estimates 240. Each of the Bootstrap Estimates 240 may be a statistic or similar estimator characterizing a respective individual sample of Bootstrap Samples 230. For example, as illustrated in FIG. 2, each of the Bootstrap Estimates 240 may be a variance-like measure of the retrieval scores of the documents included in the sample, calculated as disclosed herein. Similarly, a plurality of Bootstrap Weights 250 denoting the relative importance of each of the Bootstrap Samples 230 may optionally be obtained as well.

Bootstrap Estimates 240 may be utilized in determining a Query Performance (QP) Estimate 260, optionally with the use of Bootstrap Weights 250 too. For example, as illustrated in FIG. 2, the QP Estimate 260 may employ a measure resembling standard deviation, obtained as a square root of a weighted sum of Bootstrap Estimates 240 multiplied by Bootstrap Weights 250. In some exemplary embodiments, QP Estimate 260 may further be normalized for mitigating query-dependent effects, resulting in a Normalized QP Estimate 270. As illustrated in FIG. 2, normalization of QP Estimate 260 that yields Normalized QP Estimate 270, may utilize a measure resembling perplexity of the query q given a relevance model R which, in turn, may be estimated from the Result List 210, as disclosed herein. Further as illustrated in FIG. 2, the normalization may additionally be based on the relevance likelihood of Document Collection 209 in its entirety to the query q.

Figure 3:
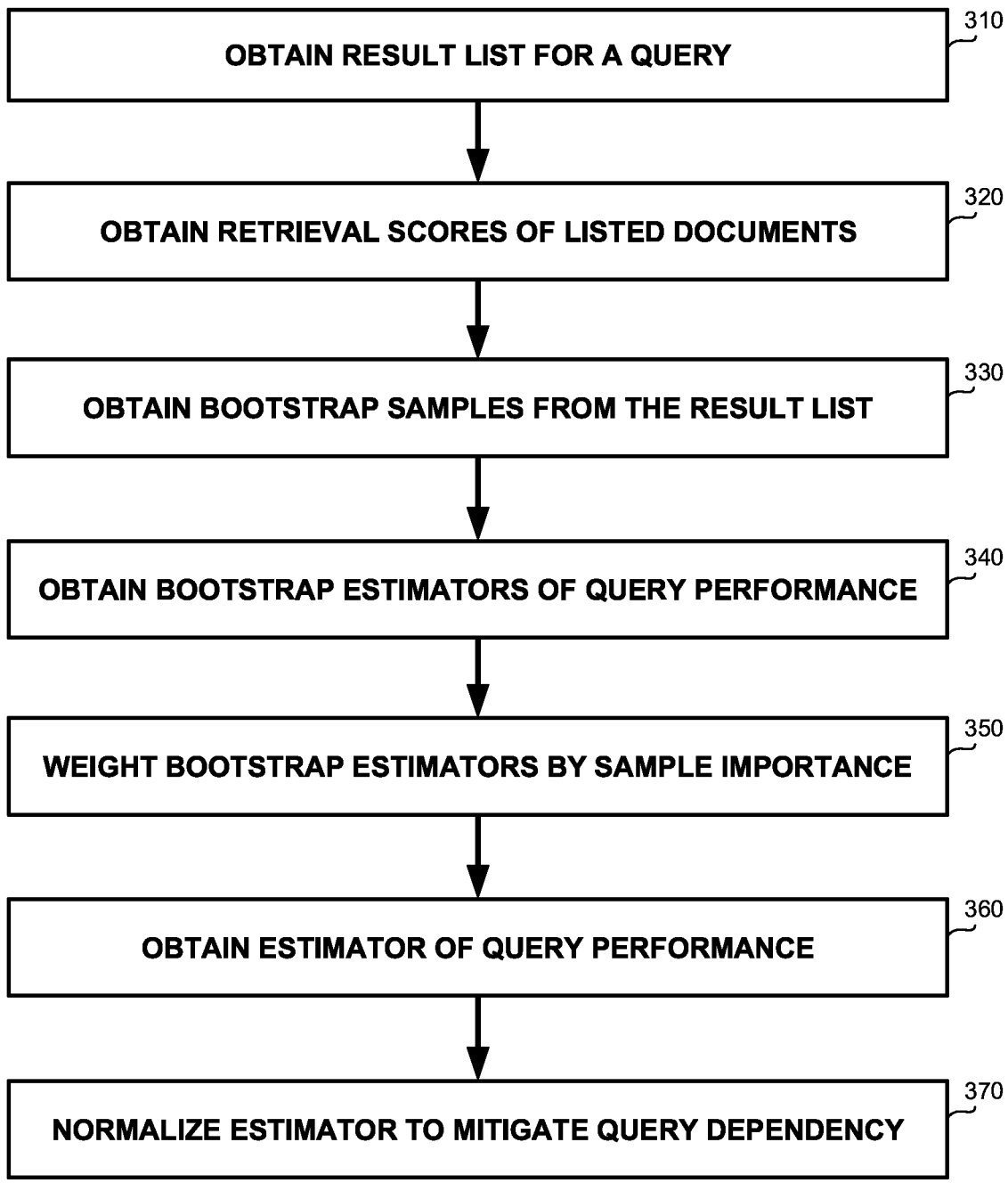
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, a result list returned by an IR system in response to a query addressed to a collection of documents may be obtained. The result list may comprise the documents in the collection deemed most relevant to the query, ordered in accordance to an estimated relevance degree from the most to least relevant.

On Step 320, retrieval scores of the result list's documents may be obtained, such as assigned to each document in the collection by the IR system.

On Step 330, the result list as obtained in Step 310 may be randomly sampled to generate a plurality of sub-lists, i.e. bootstrap samples, having a size smaller than or equal to the size of the result list. The bootstrap samples may be obtained using a sampling scheme as disclosed herein, e.g., without replacement (WOR), ranked biased, and/or round-robin sampling scheme.

On Step 340, bootstrap estimators of the query performance may be obtained for each of the bootstrap samples as generated in Step 330. The bootstrap estimators may be, for example, a measure of the diversity of the retrieval scores of the documents included in the bootstrap sample, e.g., the variance, standard deviation, or any likewise measure thereof.

On Step 350, each of the bootstrap estimators determined in Step 340 may be assigned with a weight according to a relative importance of the respective bootstrap sample. The weighting scheme may assign a uniform weight to all bootstrap samples, a weight based on similarity degree between the bootstrap sample and the result list, a weight based on deviation degree of the documents' scores of the bootstrap sample from the corpus query likelihood, or the like.

On Step 360, an estimator of query performance may be obtained based on the plurality of bootstrap estimators obtained in Step 340, and optionally further based on the bootstrap weights determined in Step 350. The query performance estimator may be calculated as a square root of a sum of the bootstrap estimators multiplied by the respective bootstrap weights, for example, as disclosed herein.

On Step 370, the query performance estimator obtained in Step 360 may further be normalized to mitigate query-dependence effects. The normalization may apply a perplexity-like measure depicting representativeness of an underlying information need by the query, optionally based on a relevance model induced by the result list. Additionally or alternatively, the normalization may employ the corpus query likelihood, whereby utilizing the collection as an ineffective reference document.

Figure 4:
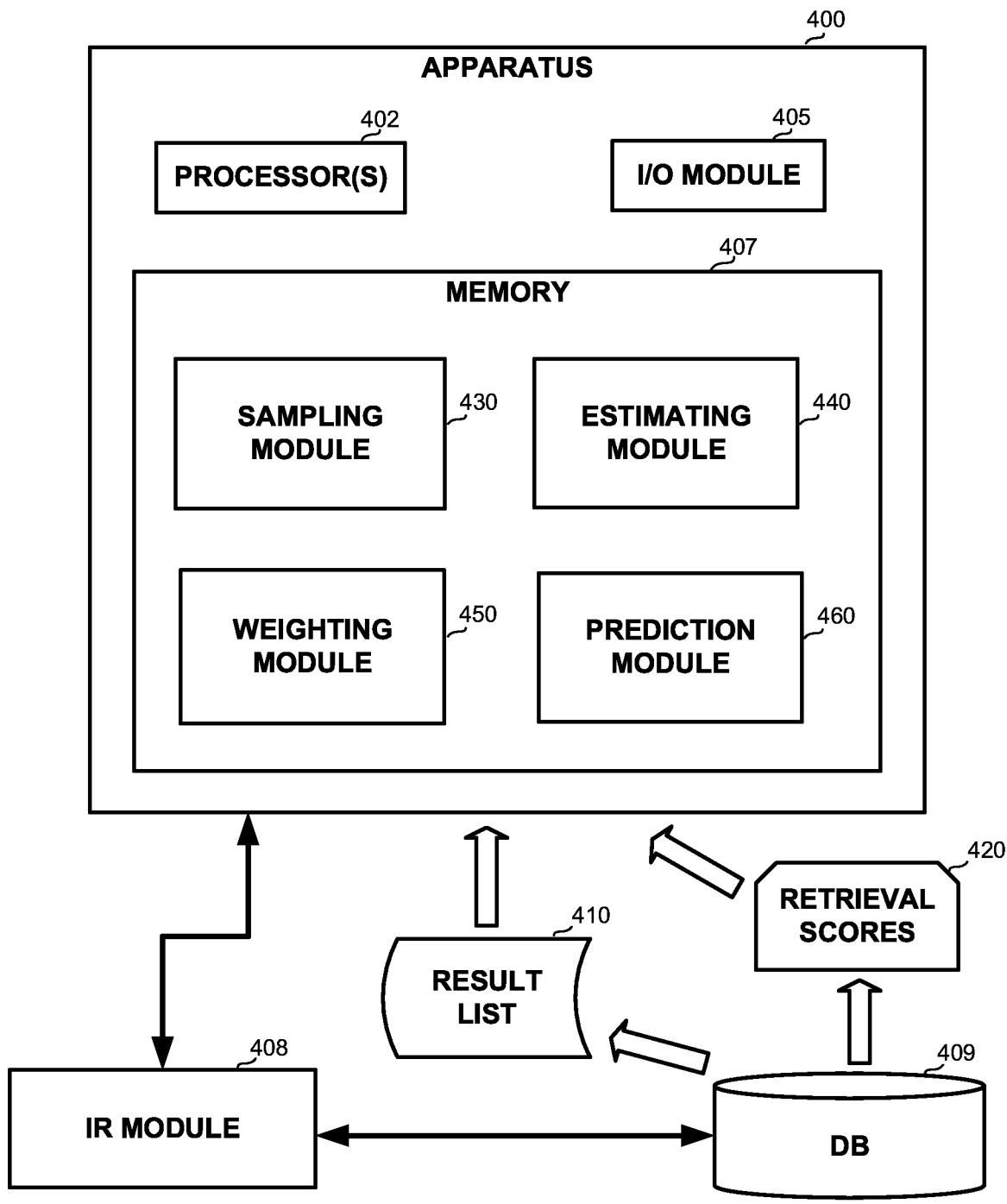
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter. An Apparatus 400 may be configured to support parallel user interaction with a real world physical system and a digital representation thereof, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from a user or another device, such as, for example, receiving a query representing an information need of the user, outputting a query performance prediction, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Apparatus 400 may comprise or be coupled to an Information Retrieval (IR) Module 408, configured to processing documents in a collection such as Database (DB) 409 and return a Result List 410 of those documents deemed as most relevant to a query received. The IR Module may be further configured to assign Retrieval Scores 420 to each of the processed documents. Apparatus 400 may be configured to obtain either one of Result List 410 and Retrieval Scores 420, as returned by IR Module 408 for a query received, via I/O Module 405, for example.

Sampling Module 430 may be configured to sample Result List 410 to obtain a plurality of bootstrap samples, similarly as in Step 330 of FIG. 3. Sampling Module 430 may be configured to employ a random sampling scheme that simulates a user interaction with a ranked result list returned in response to a query issued by the user, such as disclosed herein.

Estimating Module 440 may be configured to estimate query performance for each of the plurality of bootstrap samples obtained by Sampling Module 430, similarly as in Step 340 of FIG. 3. Estimating Module 440 may be configured to calculate a score divergence measure based on corresponding values of Retrieval Scores 420 with respect to documents included in each bootstrap sample.

Weighting Module 450 may be configured to assign weights to the bootstrap samples obtained by Sampling Module 430, similarly as in Step 350 of FIG. 3. Weighting Module 450 may be configured to apply a predetermined weighting scheme, wherein any one of the exemplary weighting schemes disclosed herein or alternate similar approaches may be used thereby.

Prediction Module 460 may be configured to provide a query performance prediction based on the query performance estimates determined by Estimating Module 440 for each of the bootstrap samples, and optionally further based on the weights assigned thereto by Weighting Module 450. In some exemplary embodiments, Prediction Module 460 may be further configured to normalize the query performance prediction in order to mitigate query-dependent effects, such as may be the case in score divergence estimators, similarly as in Step 370 of FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   obtaining a result list comprising a listing of a plurality of documents retrieved from a collection in response to a query;
   obtaining for the plurality of documents in the result list a plurality of respective scores, wherein a score of the plurality of respective scores indicates a measure of relevance of an associated document to the query;
   sampling the result list to obtain a plurality of sub-lists, wherein a sub-list of the plurality of sub-lists comprises a listing of documents subsumed in the plurality of documents of the result list, wherein sampling the result list comprises using a bootstrap sampling approach that simulates a random user browsing a retrieved result list and clicking on documents to be included in a given sub-list;
   calculating a sample performance estimator for each of the sub-lists based on a variance-like measurement of sub-list scores of the listing of the documents listed in each of the sub-lists, wherein the variance-like measurement comprises an unbiased variance estimate of document scores in each of the sub-lists, wherein the sub-list scores are from the plurality of respective scores;
   determining for the plurality of sub-lists respective weights in accordance with a predetermined weighting scheme, wherein said determining comprises determining a weight to the sub-list based on the predetermined weighting scheme; and
   estimating a performance of the plurality of documents of the result list based on the sample performance estimators of the plurality of sub-lists, respectively, and further based on the respective weights determined for the plurality of sub-lists, wherein said estimating is based on the sample performance estimator of the sub-list and based on the weight of the sub-list.

2. The computer-implemented method of claim 1, wherein said sampling of the result list is without replacement, such that a listed document of the result list is selected to a single sub-list at most.

3. The computer-implemented method of claim 1, wherein said sampling of the result list is performed using a ranked-biased random variable distribution.

4. The computer-implemented method of claim 1, wherein said sampling of the result list is performed using a round-robin scheme in accordance with a rank-ordering of the plurality of documents.

5. The computer-implemented method of claim 1, wherein the predetermined weighting scheme is selected from the group consisting of: a uniform weighting; a weighting based on a degree of similarity between the sub-list and the result list; and, a weighting based on a measure of deviation of the sub-list scores from a score of the collection.

6. The computer-implemented method of claim 1, wherein said estimating further comprises applying normalization to mitigate a dependency of the sample performance estimator on the query.

7. The computer-implemented method of claim 6, wherein normalization is applied using a perplexity measure modeling an extent to which the query represents an underlying information need.

8. The computer-implemented method of claim 6, wherein normalization is applied using the collection as an ineffective reference document.

9. The computer-implemented method of claim 1, wherein the unbiased variance estimate is based on a mean score of documents in each of the sub-lists.

10. A computerized apparatus having a processor, the processor being adapted to perform the steps of:
    obtaining a result list comprising a listing of a plurality of documents retrieved from a collection in response to a query;
    obtaining for the plurality of documents in the result list a plurality of respective scores, wherein a score of the plurality of respective scores indicates a measure of relevance of an associated document to the query;
    sampling the result list to obtain a plurality of sub-lists, wherein a sub-list of the plurality of sub-lists comprises a listing of documents subsumed in the plurality of documents of the result list, wherein sampling the result list comprises using a bootstrap sampling approach that simulates a random user browsing a retrieved result list and clicking on documents to be included in a given sub-list;
    calculating a sample performance estimator for each of the sub-lists based on a variance-like measurement of sub-list scores of the listing of the documents listed in each of the sub-lists, wherein the variance-like measurement comprises an unbiased variance estimate of document scores in each of the sub-lists, wherein the sub-list scores are from the plurality of respective scores;
    determining for the plurality of sub-lists respective weights in accordance with a predetermined weighting scheme, wherein said determining comprises determining a weight to the sub-list based on the predetermined weighting scheme; and
    estimating a performance of the plurality of documents of the result list based on the sample performance estimators of the plurality of sub-lists, respectively, and further based on the respective weights determined for the plurality of sub-lists, wherein said estimating is based on the sample performance estimator of the sub-list and based on the weight of the sub-list.

11. The computerized apparatus of claim 10, wherein said sampling of the result list is without replacement, such that a listed document of the result list is selected to a single sub-list at most.

12. The computerized apparatus of claim 10, wherein said sampling of the result list is performed using a ranked-biased random variable distribution.

13. The computerized apparatus of claim 10, wherein said sampling of the result list is performed using a round-robin scheme in accordance with a rank-ordering of the plurality of documents.

14. The computerized apparatus of claim 10, wherein the predetermined weighting scheme is selected from the group consisting of: a uniform weighting; a weighting based on a degree of similarity between the sub-list and the result list; and, a weighting based on a measure of deviation of the sub-list scores from a score of the collection.

15. The computerized apparatus of claim 10, wherein said estimating further comprises applying normalization to mitigate a dependency of the sample performance estimator on the query.

16. The computerized apparatus of claim 15, wherein normalization is applied using a perplexity measure modeling an extent to which the query represents an underlying information need.

17. A computer program product comprising a non-transitory computer readable storage medium retaining program instructions, which program instructions when read by a processor, cause the processor to perform a method comprising:

obtaining a result list comprising a listing of a plurality of documents retrieved from a collection in response to a query;

obtaining for the plurality of documents in the result list a plurality of respective scores, wherein a score of the plurality of respective scores indicates a measure of relevance of an associated document to the query;

sampling the result list to obtain a plurality of sub-lists, wherein a sub-list of the plurality of sub-lists comprises a listing of documents subsumed in the plurality of documents of the result list, wherein sampling the result list comprises using a bootstrap sampling approach that simulates a random user browsing a retrieved result list and clicking on documents to be included in a given sub-list;

calculating a sample performance estimator for each of the sub-lists based on a variance-like measurement of sub-list scores of the listing of the documents listed in each of the sub-lists, wherein the variance-like measurement comprises an unbiased variance estimate of document scores in each of the sub-lists, wherein the sub-list scores are from the plurality of respective scores;

determining for the plurality of sub-lists respective weights in accordance with a predetermined weighting scheme, wherein said determining comprises determining a weight to the sub-list based on the predetermined weighting scheme; and estimating a performance of the plurality of documents of the result list based on the sample performance estimators of the plurality of sub-lists, respectively, and further based on the respective weights determined for the plurality of sub-lists, wherein said estimating is based on the sample performance estimator of the sub-list and based on the weight of the sub-list.

* * * * *